H. DAVIES.
Safety-Valves.

No. 135,698.                                     Patented Feb. 11, 1873.

UNITED STATES PATENT OFFICE.

HENRY DAVIES, OF NEWPORT, KENTUCKY.

IMPROVEMENT IN SAFETY-VALVES.

Specification forming part of Letters Patent No. 135,698, dated February 11, 1873.

*To all whom it may concern:*

Figure 1:
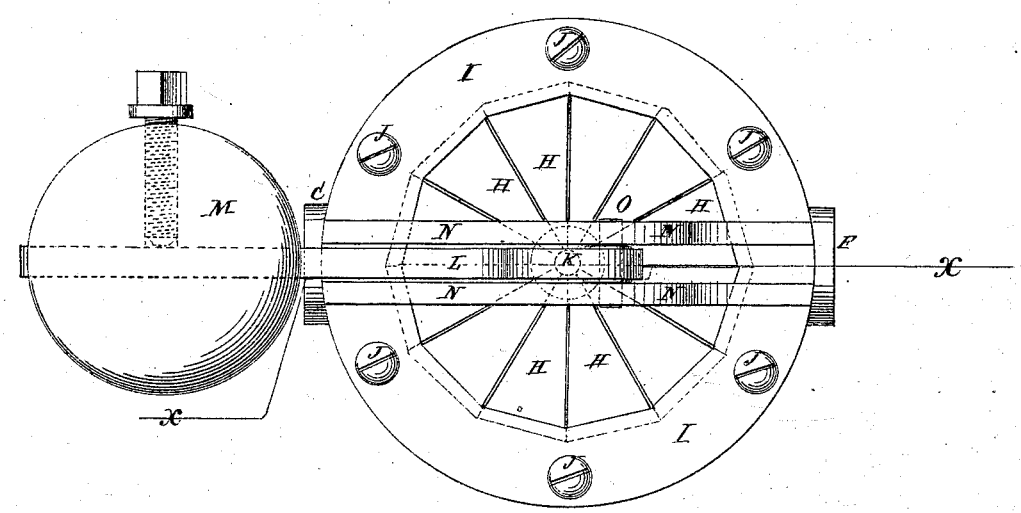
Figure 2:
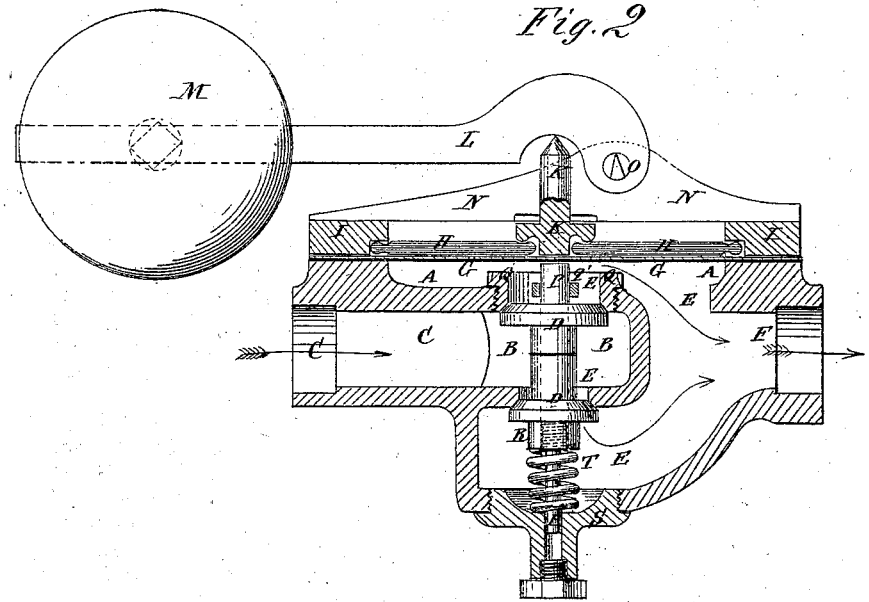

Be it known that I, HENRY DAVIES, of Newport, in the county of Campbell and State of Kentucky, have invented a new and useful Improvement in Pressure-Regulating Valve for Steam, Gas, &c., of which the following is a specification:

Figure 1 is a top view of my improved valve. Fig. 2 is a detail vertical section of the same taken through the line $x$ $x$, Fig. 1.

Similar letters of reference indicate corresponding parts.

My invention has for its object to furnish a device for automatically regulating the pressure of steam, gases, fluids, &c., without regard to the pressure in the boiler, generator, or reservoir, or to the amount passing through the machine; and it consists in the construction and combination of the various parts of the device, as hereinafter more fully described.

A is a polygonal dish-shaped recess formed in the upper part of the body of the device. B is the valve-chamber, into which the steam, gas, or fluid enters through the pipe or passage C. D is a double-beat valve, which closes and opens the passages or ports E, leading from the valve-chamber B, at the opposite ends of the valve D, into the pipe F. The dish A, valve-chamber B, and passages C E F are all cast in the same piece of casting. G is a diaphragm, of steel or other suitable sheet metal, which rests upon the edge of the dish A, and is secured to said edges by the ring I and bolts J. The inner edge of the ring I is made polygonal in form to correspond with the shape of the dish A. H are radial or triangular plates which rest upon the diaphragm G, and the base ends or sides of which enter a rabbet in the lower inner edge of the ring I. The small ends or apexes of the radial plates H reach nearly to the center of the dish A, where they are secured in place by the collar upon the collar-pin K, the lower end of which rests upon the center of the diaphragm G. The outer ends of the plates H are rounded off, and their inner ends are rounded off and grooved to enable them to move easily with the movement of the diaphragm G. The lower side of the collar of the collar-pin K is concaved for the same reason. The pin K is held down by the lever L and weight M, adjustably suspended from said lever. The pin K passes up between two brackets, N, formed upon the ring I, and to and between which is pivoted the lever L, as shown in Figs. 1 and 2. The pivot O of the lever L is a knife-edge, and the upper end of the pin K is conical or pointed, so that the lever L may work upon its bearings with the least possible friction. The valve D I prefer to make in two parts, connected together by the stem or bolt P, to which they are secured by a nut, R. The upper end or head of the bolt or stem P passes through the guide $q'$ in the valve-seat Q, which is made in the form of a bushing to allow the upper part of the valve D to be inserted. The upper end of the bolt or stem P abuts against the center of the diaphragm G directly beneath the lower end of the collar-pin K. The other or lower end of the stem or bolt P, below the nut R, is made smaller, and extends into and works in a guide-hole in the cap S, that closes the opening through which the lower part of the valve D is introduced. In using the device the weight M is adjusted into such a position upon the lever L that it will require exactly the required amount of pressure upon the diaphragm G to raise it. The upper part of the valve D is made the larger, so that were the valve left free and steam introduced the valve would be closed by the steam pressure. The valve D is pressed down and opened by the pressure of the weight M pressing the diaphragm G down upon the upper end of the stem or bolt P. As long as the steam pressure on the dish A is equal to or less than the amount determined upon, the valve will remain open and the steam will flow through the passage F continuously. Should the pressure in the dish A at any time exceed the amount determined upon it will raise the diaphragm G, allowing the steam pressure to close the valve D until the pressure in the dish A has been again reduced to the desired amount, so that the pressure in the dish A, and consequently in the passage F, will be kept always the same whatever may be the pressure in the boiler, generator, or reservoir. The faces of the two parts of the valve D are made nearly of the same size, so that it will require but little pressure to open it, and it is held up to its seats by a spring, T, coiled around the lower end of the bolt or stem P, to prevent it from being opened by the downward pressure of the end of the lever when shifting or adjusting the weight M.

A spool-valve may be used instead of the double-beat valve D, if desired.

Having thus described my invention, I claim as new and desire to secure by Letters Patent—

1. The combination, with diaphragm G, of the radial plates H, constructed as shown and set forth, and arranged with the rear ends loose in the rabbets of ring I, and the front ends in the concavities of collar K, as and for the purpose described.

2. The valve D, made in two parts and held together on stem P by a spring, as and for the purpose described.

HENRY DAVIES.

Witnesses:
J. B. FORAKER,
THOS. D. HAMILTON.